(12) United States Patent
Aten et al.

(10) Patent No.: US 11,085,398 B2
(45) Date of Patent: Aug. 10, 2021

(54) CORE AIR FLOW TO EQUALIZE TEMPERATURE DIFFERENTIAL

(71) Applicant: Rohr, Inc., Chula Vista, CA (US)

(72) Inventors: Michael Aten, San Diego, CA (US); Adam Saunders, Chula Vista, CA (US); Gary E. Bowman, Lenzie (GB)

(73) Assignee: Rohr, Inc., Chula Vista, CA (US)

( * ) Notice: Subject to any disclaimer, the term of this patent is extended or adjusted under 35 U.S.C. 154(b) by 219 days.

(21) Appl. No.: 16/351,031

(22) Filed: Mar. 12, 2019

(65) Prior Publication Data

US 2020/0291891 A1 Sep. 17, 2020

(51) Int. Cl.
| F02K 1/82 | (2006.01) |
| F02K 1/38 | (2006.01) |
| F02K 1/64 | (2006.01) |
| F02K 1/76 | (2006.01) |
| F02K 1/34 | (2006.01) |

(52) U.S. Cl.
CPC ............. *F02K 1/827* (2013.01); *B64D 33/06* (2013.01); *F02K 1/38* (2013.01); *F02K 1/64* (2013.01); *F02K 1/76* (2013.01)

(58) Field of Classification Search
CPC ... F02K 1/827; F02K 1/30; F02K 1/38; F02K 1/46; F02K 1/34; B64D 33/06
See application file for complete search history.

(56) References Cited

U.S. PATENT DOCUMENTS

| 6,308,898 | B1 | 10/2001 | Dorris, III et al. |
| 7,784,283 | B2 | 8/2010 | Yu et al. |
| 8,096,105 | B2 | 1/2012 | Porte |
| 8,484,943 | B2 | 7/2013 | Cunha et al. |
| 10,094,334 | B2 | 10/2018 | Moore et al. |
| 2003/0140615 | A1 | 7/2003 | Le Docte |
| 2008/0044280 | A1 | 2/2008 | Le Docte |
| 2008/0271431 | A1* | 11/2008 | Porte ........................ F02K 1/50 60/226.1 |
| 2012/0023901 | A1* | 2/2012 | Gilson ...................... F02K 3/06 60/226.3 |
| 2012/0160933 | A1 | 6/2012 | Vauchel |
| 2014/0248116 | A1* | 9/2014 | Ali ........................... F02C 7/24 415/1 |

OTHER PUBLICATIONS

EP search report for EP19212402.2 dated Jun. 19, 2020.

* cited by examiner

*Primary Examiner* — Andrew H Nguyen
(74) *Attorney, Agent, or Firm* — Getz Balich LLC

(57) ABSTRACT

A exhaust nozzle assembly comprises a nozzle that extends about an axial centerline and includes an exhaust nozzle flange; an radially inner surface that comprises an axially forward inner surface; a noise attenuating structure; a through hole inlet formed in the axially forward inner surface; a through hole outlet formed in the axially rear inner surface. The nozzle assembly also includes a radially outer surface that is radially separated from the radially inner surface by a nozzle cavity, where engine core air enters the nozzle cavity from the through hole inlet and exits the nozzle cavity axially downstream of the hole inlet via the through hole outlet.

15 Claims, 5 Drawing Sheets

CORE AIR FLOW TO EQUALIZE TEMPERATURE DIFFERENTIAL

BACKGROUND OF THE INVENTION

1. Technical Field

The present disclosure relates to aircraft gas turbine nacelles, and more particularly to equalizing temperature difference across a noise attenuating structure on a gas turbine exhaust nozzle.

2. Background Information

A temperature differential of approximately of 600° F. exists between the inner and outer skins of an exhaust nozzle manufactured from Ceramic Matrix Composite (CMC). Such a temperature differential may result in differing degrees of thermal expansion within the nozzle assembly sandwich structure, which may result in delamination or core separation. There is a need for an exhaust nozzle that is configured to equalize temperature difference across a noise attenuating structure of the nozzle.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are direct to a gas turbine exhaust nozzle assembly that comprises an engine flange and an exhaust nozzle that extends circumferentially about an axial centerline. The exhaust nozzle comprises an exhaust nozzle flange that is removably and replaceably secured to the engine flange; a radially inner surface that comprises an axially forward inner surface; a noise attenuating structure comprising a perforated layer, a base layer, and a core layer, all of which are radially stacked in a superimposed relationship so that the core layer is disposed between the perforated layer and the base layer; an axially rear inner surface that is axially rearward of the noise attenuating structure, where the axially forward inner surface, the perforated layer and the axially rear inner surface are radially aligned to form the radially inner surface; at least one through hole inlet formed in at least one of the axially forward inner surface and the base layer; at least one through hole outlet formed in the axially rear inner surface; and a radially outer surface that is radially separated from the radially inner surface by a nozzle cavity, where engine core air enters the nozzle cavity from the at least one through hole inlet and exits the nozzle cavity axially downstream of the at least one through hole inlet via the at least one through hole outlet.

The perforated layer may be configured to permit noise to pass there through, the core layer may include a substructure that is operable to receive an amount of the noise that passes through the perforated layer that is operable to reflect the amount of the noise off the base layer such that sound waves of reflected noise are out of phase with and destructively interfere with sound waves of noise outside the substructure.

The substructure may comprise a honey-comb shaped matrix.

The substructure may include at least one of an N-shaped core, a rod shaped core or a deep cavity structure.

The base layer and the perforated layer may be manufactured from ceramic matrix composites.

The base layer may be imperforate and the engine core air enters the nozzle cavity through the axially forward inner surface.

An exhaust centerbody may be located radially within the axially forward inner surface and coaxial with the axial centerline.

Aspects of the disclosure are also directed to a gas turbine exhaust nozzle assembly, comprising an engine flange and an exhaust nozzle that extends circumferentially about an axial centerline, The exhaust nozzles comprises an exhaust nozzle flange that is removably and replaceably secured to the engine flange; an radially inner surface that comprises an imperforate axially forward inner surface; a noise attenuating structure comprising a first perforated layer, a second perforated layer, and a core layer, all of which are radially stacked in a superimposed relationship so that the core layer is disposed between the first and second perforated layers; an axially rear inner surface that is axially rearward of the noise attenuating structure, where the axially forward inner surface, the first perforated layer and the axially rear inner surface are radially aligned to form the radially inner surface; a through hole outlet formed in the axially rear inner surface; and a radially outer surface that is radially separated from the radially inner surface by a nozzle cavity, where engine core air enters the nozzle cavity by passing through the first and second perforated layers and exits the nozzle cavity via the through hole outlet located axially aft of the first and second perforated layers.

A plurality of through hole outlets may be arranged annular on the axially rear inner surface about the axial centerline.

An annular slit may be axially downstream of the noise attenuating structure and in the axially rear inner surface about the axial centerline, where the annular slit allows core air within the nozzle cavity to exit the nozzle cavity and mix with core air that did not enter the nozzle cavity.

A thrust reverser may be axially forward of the exhaust nozzle.

The core air may originate from a low pressure turbine outlet.

A bracket may connect an inner surface of the radially outer surface with a radially exterior surface of the second perforated layer, where a seal is located between the second perforated layer and the inner surface of the radially outer surface.

A seal may be located axially upstream of the through hole inlet to prevent back flow of core air from the nozzle cavity.

Aspects of the disclosure are further directed to a method of controlling flow in a gas turbine having a nacelle that includes a centerbody and exhaust nozzle. The method comprises receiving engine core air in a first cavity formed between the centerbody and the exhaust nozzle, where the centerbody and the exhaust nozzle are co-axial with respect to an axial centerline of the gas turbine; routing a portion of the engine core air from the first cavity to a second cavity between a radially outer surface of the exhaust nozzle and a base layer of a noise attenuating structure, where the noise attenuating structure comprises a perforated layer, the base layer, and a core layer, all of which are radially stacked in a superimposed relationship so that the core layer is disposed between the perforated layer and the base layer; and routing, axially downstream of the noise attenuating surface, the engine core in the second cavity to the first cavity via a through hole outlet formed in an axially rear inner surface of the exhaust nozzle.

The routing of the portion of the engine core air from the first cavity to the second cavity may be via at least one through hole inlet formed in at least one of an exhaust nozzle flange located axially upstream of the noise attenuating surface and the base layer.

The base layer may be imperforate and the engine core air enters the second cavity through an axially forward inner surface of the exhaust nozzle flange.

The base layer may be perforated and the engine core air enters the second cavity through the base layer.

The core layer may comprise at least one of a honeycomb shaped core matrix, an N-shaped core, a rod shaped core or a deep cavity structure.

DETAILED DESCRIPTION

The present disclosure may describe one or more features as having a length extending relative to an x-axis, a width extending relative to a y-axis, and/or a height extending relative to a z-axis. The drawings illustrate the respective axes. The present disclosure uses the terms or phrases "circumferential", "annular", "abut", and "noise suppression", and variations thereof, to describe one or more features. The term "circumferential", and variations thereof, are used herein to indicate that a feature extends along a curve that is centered about an axis of rotation. The term "annular", and variations thereof, are used herein to indicate that a feature is at least partially in the form of a ring (e.g., a ring in a circular shape or another shape). The term "abut", and variations thereof, are used herein to indicate either that a feature is in direct contact with another feature, or that a feature is in such close proximity to another feature that it is almost in direct contact with that feature. The phrase "noise suppression", and variations thereof, are used herein to indicate an amplitude of a sound wave is reduced.

Figure 1:
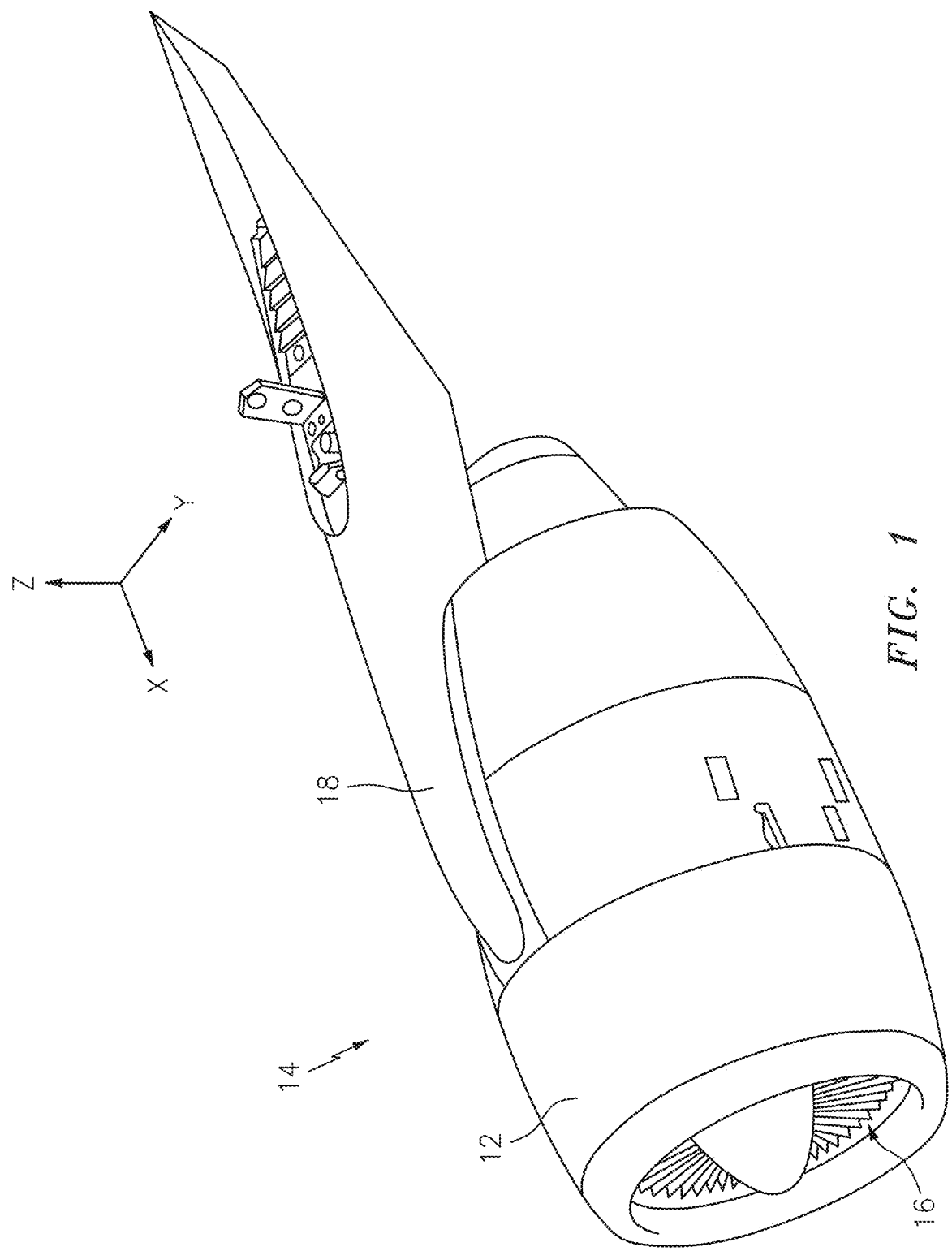
FIG. 1 is a perspective view of an aircraft gas turbine engine.
Figure 2:
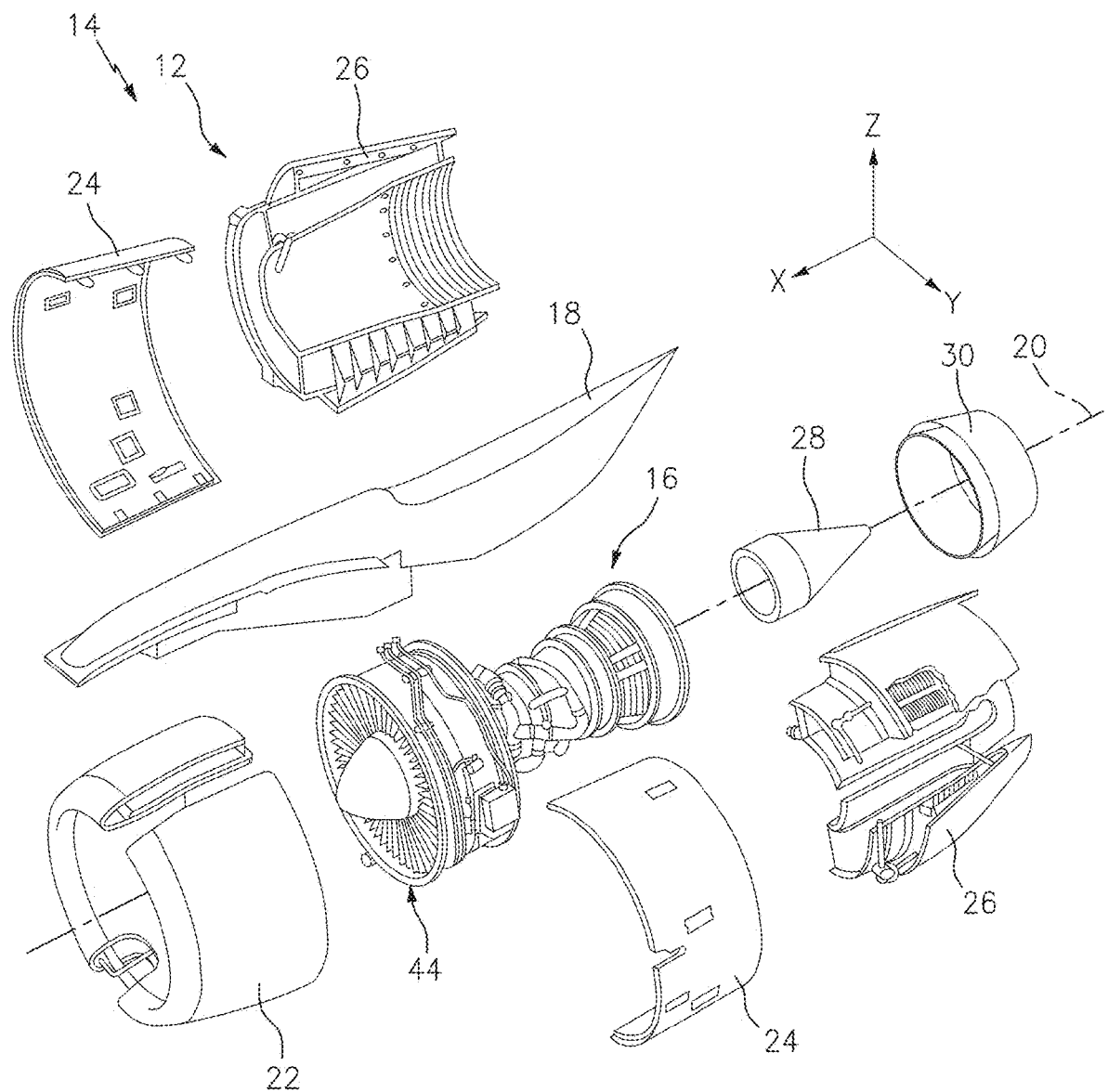
FIG. 2 is an exploded perspective view of the engine of FIG. 1.

Referring to FIGS. 1 and 2, a nacelle 12 is included in an aircraft gas turbine engine system 14. The engine system 14 and the nacelle 12 can be configured in various different ways. In the embodiment illustrated in FIG. 1, the engine system 14 is a turbofan that includes a gas turbine engine 16 and a pylon 18 in addition to the nacelle 12. In the embodiment illustrated in FIG. 2, the gas turbine engine 16 extends in a lengthwise direction along an axial centerline 20. The nacelle 12 partially surrounds the gas turbine engine 16 and the pylon 18 connects the nacelle 12 and the gas turbine engine 16 to the underside of an aircraft wing (not shown).

In this embodiment, the nacelle 12 includes an inlet 22, a fan cowl 24, a thrust reverser 26, an exhaust centerbody 28, and an exhaust nozzle 30.

Figure 3:
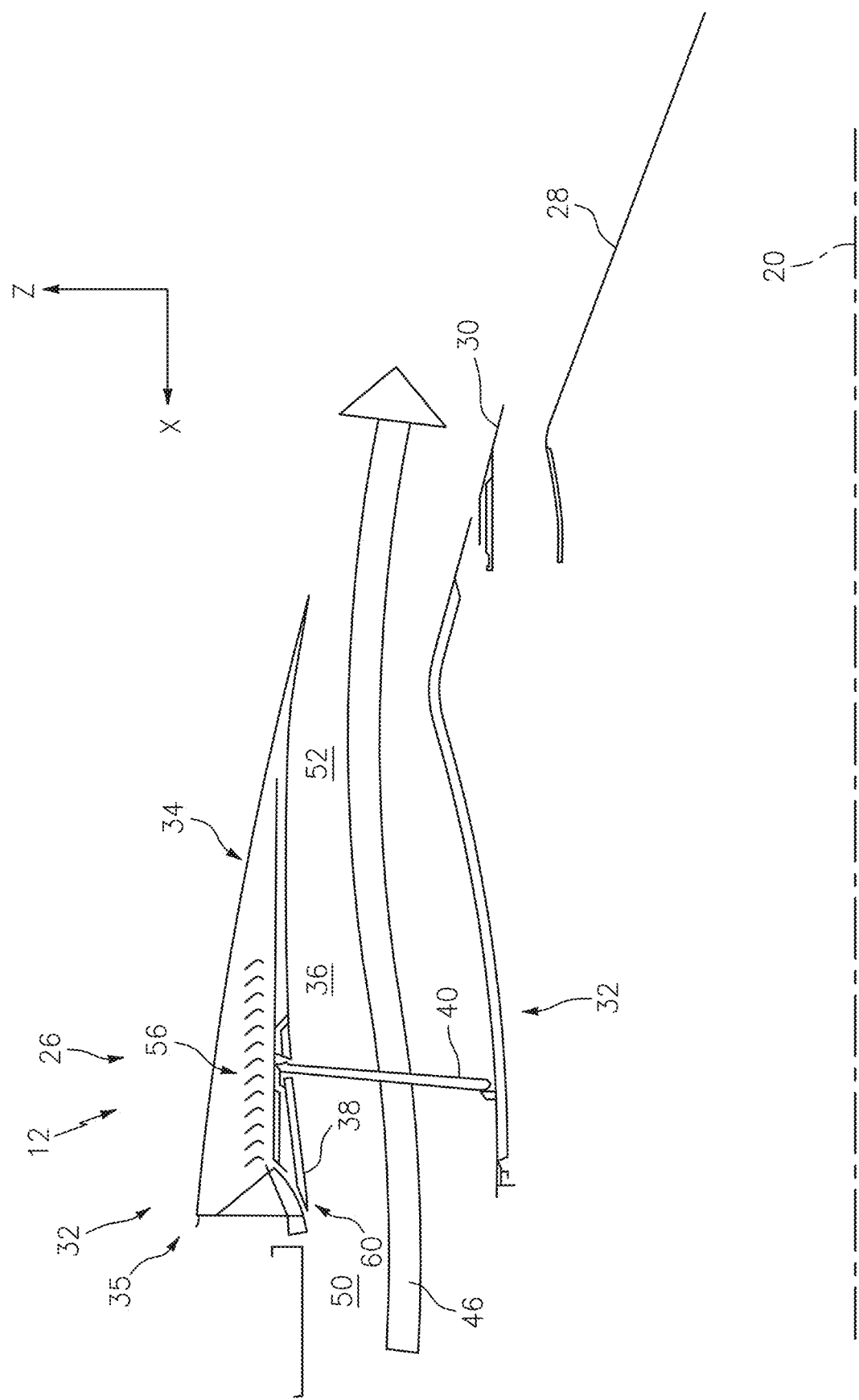
FIG. 3 is a sectional schematic view of a thrust reverser, exhaust centerbody, and exhaust nozzle portions of a nacelle that is included in the engine of FIG. 1, where a translating structure and blocker doors of the thrust reverser are in their respective stowed positions.

FIG. 3 is a sectional schematic view of the thrust reverser 26, exhaust centerbody 28, and exhaust nozzle 30 portions of the nacelle 12 that is included in the engine of FIG. 1, where a translating structure 34 and blocker doors 38 of the thrust reverser 26 are in their respective stowed positions.

Referring to FIGS. 2 and 3, during operation of the engine system 14, an airstream (not shown) enters the gas turbine engine 16 through a fan section 44 that is located at a forward end of the gas turbine engine 16. The airstream is thereafter divided into at least a core airstream (not shown) and a bypass airstream 46 (FIG. 3). In this embodiment, the core airstream enters the gas turbine engine 16, where it is accelerated and then discharged through an aft end of the gas turbine engine 16. The core airstream is then finally discharged through the exhaust nozzle 30 portion of the nacelle 12 to provide forward thrust. In the embodiment illustrated in FIG. 3 where the translating structure 34 is in its stowed position, the bypass airstream 46 can pass from a forward end 50 of the bypass duct 36 to an aft end 52 of the bypass duct 36, through which it can be discharged to provide forward thrust. Drag links 40 each block only a small circumferential portion of the bypass duct 36, and thus the bypass airstream 46 can pass around them relatively easily. The translating structure 34 covers an array of cascades 56 that are included in the radially outer portion 35 of the fixed structure 32 of the thrust reverser 26, thereby blocking the bypass airstream 46 from passing through the array of cascades 56. When the translating structure 34 is in its deployed position, the array of cascades 56 is exposed, and the blocker doors 38 are deployed to redirect substantially all of the bypass airstream 46 toward the array of cascades 56, through which the bypass airstream 46 can be discharged to generate reverse thrust. The array of cascades 56 extends circumferentially about the centerline 20 of the gas turbine engine 16.

Figure 4:
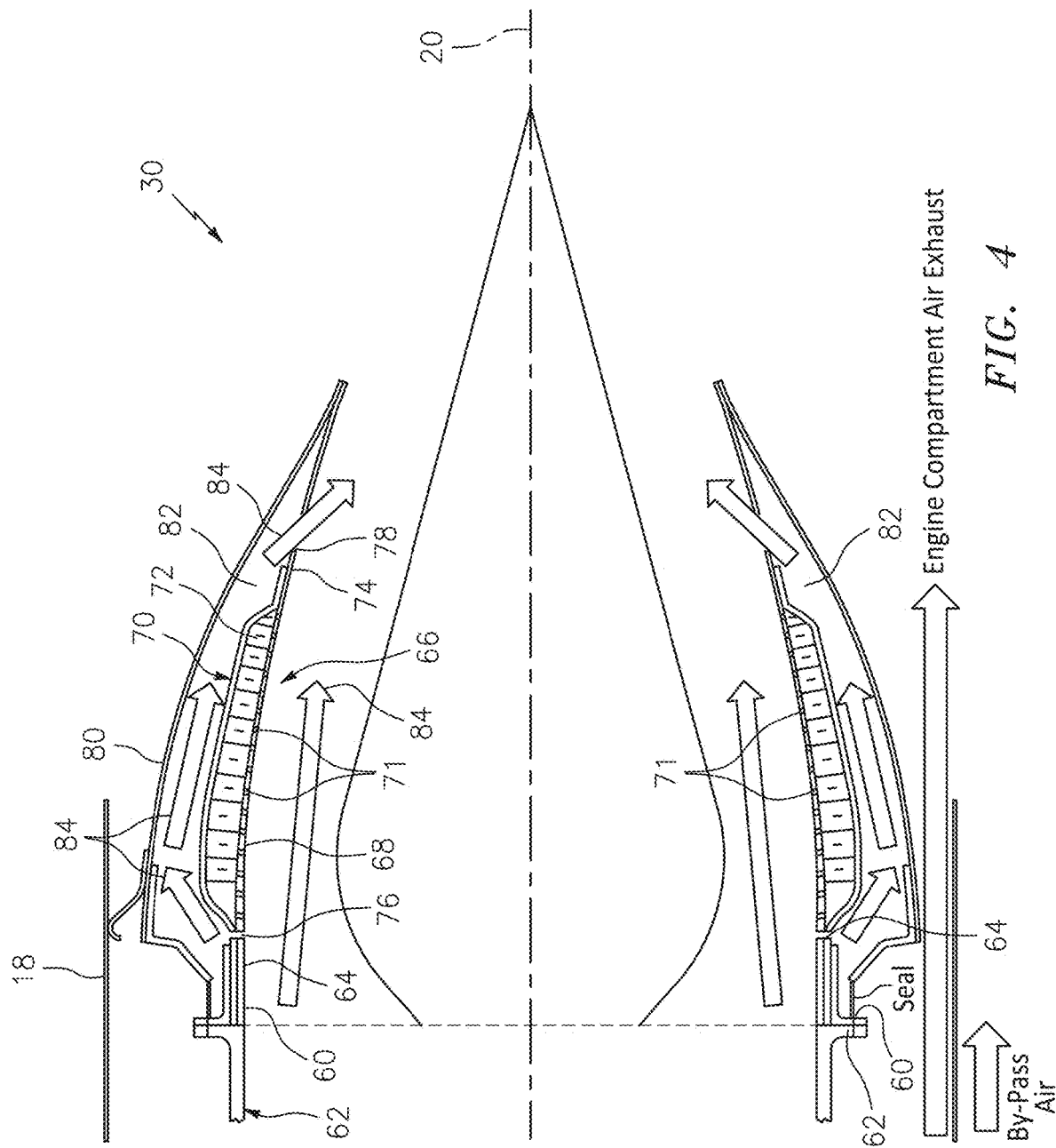
FIG. 4 is a sectional schematic view of an engine pylon fairing and exhaust nozzle portions of a nacelle that may be is included in the engine of FIG. 1.

FIG. 4 is a sectional schematic view of the engine pylon fairing 18 and exhaust nozzle 30 portions of the nacelle 12 that may be is included in the engine of FIG. 1. The exhaust nozzle 30 extends circumferentially about the axial centerline 20 and includes an exhaust nozzle flange 60 that is removably and replaceably secured to an engine flange 62. The exhaust nozzle 30 also includes an inner surface that comprises an axially forward inner surface 64, a noise attenuating structure 66 comprising a perforated layer 68, a base layer 70, and a core layer 72, all of which are radially stacked in a superimposed relationship so that the core layer 72 is disposed between the perforated layer 68 and the base layer 70. The inner surface also includes an axially rear inner surface 74 that is axially rearward of the noise attenuating structure 66, where the axially forward inner surface 64, the perforated layer 68 and the axially rear inner surface 74 are radially aligned to form the inner surface. A through hole inlet 76 is formed in the axially forward inner surface 64, and a through hole outlet 78 is formed in the axially rear inner surface 74. An outer surface 80 that is radially separated from the inner surface by a nozzle cavity 82, where engine core air 84 enters the nozzle cavity 82 from the through hole inlet 76 and exits the nozzle cavity 82 via the through hole outlet 78.

Redirecting core air into the nozzle cavity 82 reduces the differential in thermal exposure between the back skin 70 and the perforated layer 68. This is particularly beneficial in when the back skin 70 and the perforated layer 68 are manufactured from ceramic matrix composites.

The perforated layer 68, an imperforate base layer/back skin 70, and the core layer 72, all of which are stacked in a superimposed relationship so that the core layer 72 is disposed between the perforated layer 68 and the base layer 70. In the structure shown in FIG. 4, the perforated layer 68 includes a plurality of apertures 71 that are configured to permit noise and core air to pass through; the core layer 72 includes a plurality of honeycomb-shaped substructures or similar open-cell matrix; each substructure is operable to receive an amount of the noise that passes through one or more of the apertures 71 in the perforated layer 68; and each substructure is operable to reflect the noise back out of the apertures such that sound waves of the reflected noise are out of phase and destructively interfere with sound waves of noise outside the substructure in a known manner. In some embodiments similar to the one illustrated in FIG. 4, the substructure can be configured (or "tuned") to suppress noise having one or more predetermined wavelengths. In such embodiments, the predetermined wavelengths can correspond to one or more wavelengths of the noise that may be present within the engine system 14. In alternative embodiments the core layer 72 may include, for example, an N shaped core, a rod shaped core or a deep cavity structure.

Figure 5:
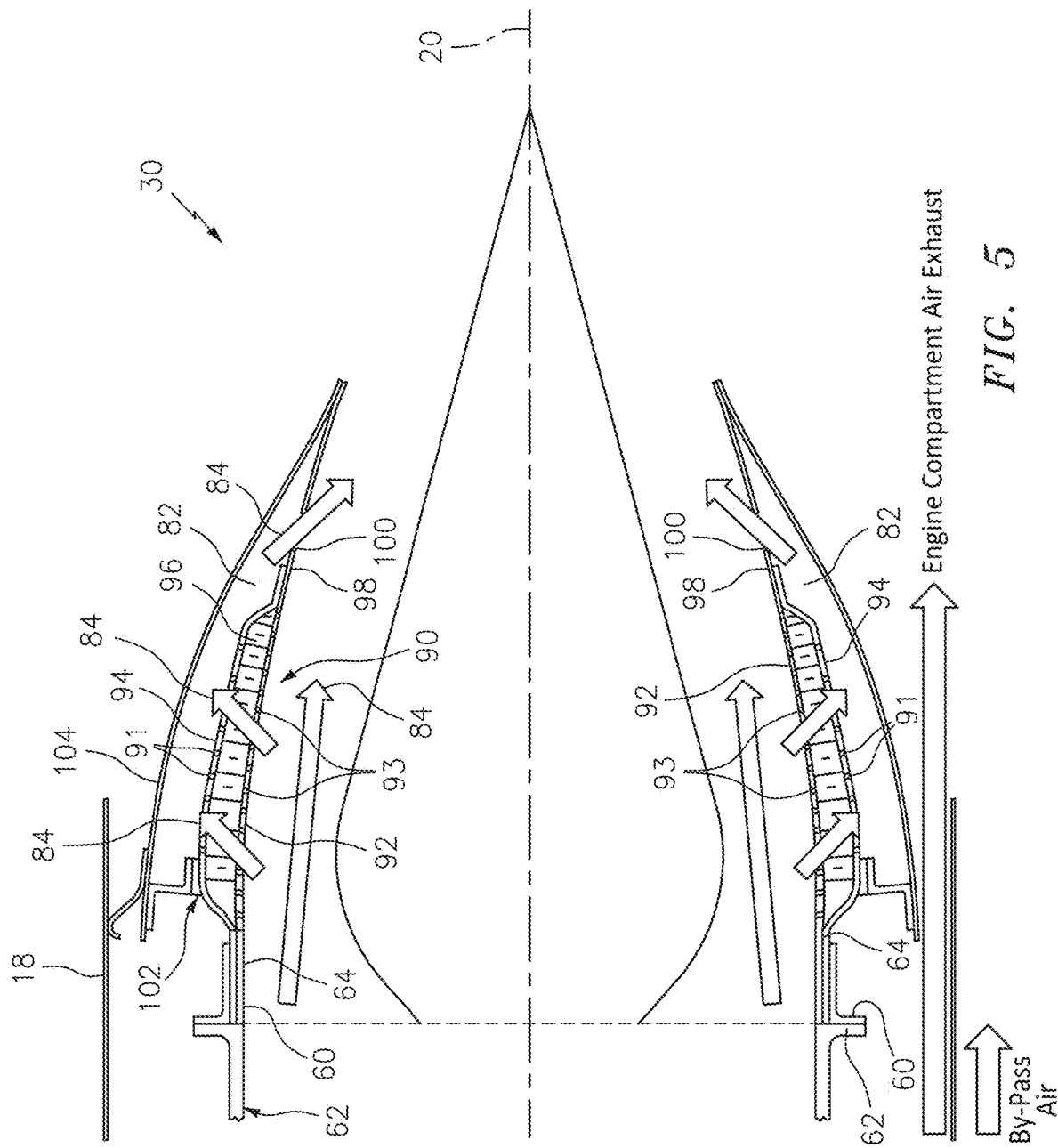
FIG. 5 is a sectional schematic view of an engine pylon fairing and exhaust nozzle portions of an alternative embodiment nacelle that may be included in the engine of FIG. 1.

FIG. 5 is a sectional schematic view of the engine pylon fairing 18 and alternative embodiment exhaust nozzle 30 portions of the nacelle 12 that may be is included in the engine of FIG. 1. The exhaust nozzle 30 extends circumferentially about the axial centerline 20 and includes an exhaust nozzle flange 60 that is removably and replaceably secured to an engine flange 62. The exhaust nozzle 30 also includes an inner surface that comprises an axially forward inner surface 64, a noise attenuating structure 90 comprising a perforated layer 92, a perforated base layer 94, and a core layer 96, all of which are radially stacked in a superimposed relationship so that the core layer 96 is disposed between the perforated layer 92 and the perforated base layer 94. The inner surface also includes an axially rear inner surface 98 that is axially rearward of the noise attenuating structure 90, where the axially forward inner surface 64, the perforated layer 92 and the axially rear inner surface 98 are radially aligned to form the inner surface. Engine core air 84 may pass via apertures 93 through the perforated layer 92 and via apertures 91 through the perforated base layer 94 into nozzle cavity 82, and exits the nozzle cavity via the through hole outlet 100. A seal 102 (e.g., metallic mesh, composite mesh, et cetera) prevents backflow from the nozzle cavity 82.

Again in this embodiment the core air in the nozzle cavity 82 reduces the differential in thermal exposure between outer surface 104 and the perforated layer 92, which may be particularly beneficial when the back skin and the perforated layer are manufactured from ceramic matrix composites.

Although the different non-limiting embodiments have specific illustrated components, the embodiments are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed in the illustrated embodiment, other arrangements will benefit herefrom.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine exhaust nozzle assembly, comprising:
an engine flange;
an exhaust nozzle that extends circumferentially about an axial centerline, comprising
an exhaust nozzle flange that is removably and replaceably secured to the engine flange;
a radially inner surface that comprises an axially forward inner surface;
a noise attenuating structure comprising a perforated layer, a base layer, and a core layer, all of which are radially stacked in a superimposed relationship so that the core layer is disposed between the perforated layer and the base layer;
an axially rear inner surface that is axially rearward of the noise attenuating structure, where the axially forward inner surface, the perforated layer and the axially rear inner surface are radially aligned to form the radially inner surface;
at least one through hole inlet formed in at least one of the axially forward inner surface and the base layer;
at least one through hole outlet formed in the axially rear inner surface; and
a radially outer surface that is radially separated from the radially inner surface by a nozzle cavity, where engine core air enters the nozzle cavity from the at least one through hole inlet and exits the nozzle cavity axially downstream of the at least one through hole inlet via the at least one through hole outlet.

2. The gas turbine exhaust nozzle assembly of claim 1, wherein the perforated layer is configured to permit noise to pass there-through, the core layer includes a substructure that is operable to receive an amount of the noise that passes through the perforated layer that is operable to reflect the amount of the noise off the base layer such that sound waves of reflected noise are out of phase with and destructively interfere with sound waves of noise outside the substructure.

3. The gas turbine exhaust nozzle assembly of claim 2, wherein the substructure comprises a honey-comb shaped matrix.

4. The gas turbine exhaust nozzle assembly of claim 2, wherein the substructure includes at least one of an N-shaped core, a rod shaped core or a deep cavity structure.

5. The gas turbine exhaust nozzle assembly of claim 1, where the base layer and the perforated layer are manufactured from ceramic matrix composites.

6. The gas turbine exhaust nozzle assembly of claim 1, where the base layer is imperforate and the engine core air enters the nozzle cavity through the axially forward inner surface.

7. The gas turbine exhaust nozzle assembly of claim 1 further comprising an exhaust centerbody radially within the axially forward inner surface and coaxial with the axial centerline.

8. The gas turbine exhaust nozzle assembly of claim 1, where the core air originates from a low pressure turbine outlet.

9. The gas turbine exhaust nozzle assembly of claim 8, further comprising a seal axially upstream of the at least one through hole inlet to prevent back flow of the core air from the nozzle cavity.

10. A gas turbine exhaust nozzle assembly, comprising:
an engine flange;
an exhaust nozzle that extends circumferentially about an axial centerline, comprising an exhaust nozzle flange that is removably and replaceably secured to the engine flange;
a radially inner surface that comprises an imperforate axially forward inner surface;
a noise attenuating structure comprising a first perforated layer, a second perforated layer, and a core layer, all of which are radially stacked in a superimposed relationship so that the core layer is disposed between the first and the second perforated layers;
an axially rear inner surface that is axially rearward of the noise attenuating structure, where the axially forward inner surface, the first perforated layer and the axially rear inner surface are radially aligned to form the radially inner surface;
a through hole outlet formed in the axially rear inner surface; and
a radially outer surface that is radially separated from the radially inner surface by a nozzle cavity, where engine core air enters the nozzle cavity by passing through the first and the second perforated layers and exits the nozzle cavity via the through hole outlet located axially aft of the first and the second perforated layers.

11. The gas turbine exhaust nozzle assembly of claim 10, wherein the through hole outlet is one of a plurality of through hole outlets arranged annularly on the axially rear inner surface about the axial centerline.

12. The gas turbine exhaust nozzle assembly of claim 10, wherein the through hole outlet is an annular slit axially downstream of the noise attenuating structure and in the axially rear inner surface about the axial centerline, where the annular slit allows core air within the nozzle cavity to exit the nozzle cavity and mix with core air that did not enter the nozzle cavity.

13. The gas turbine exhaust nozzle assembly of claim 10, wherein a thrust reverser is axially forward of the exhaust nozzle.

14. The gas turbine exhaust nozzle assembly of claim 10, where the core air originates from a low pressure turbine outlet.

15. The gas turbine exhaust nozzle assembly of claim 14 further comprising a bracket that connects the radially outer surface with a radially exterior surface of the second perforated layer, where a seal is located between the second perforated layer and the radially outer surface.

* * * * *